April 8, 1952 G. ROLLAT 2,592,339
MICROSCOPE MEASURING DEVICE
Filed Dec. 18, 1947 2 SHEETS—SHEET 1

Inventor
Germain Rollat
By Robert E. Burns
Attorney

April 8, 1952        G. ROLLAT        2,592,339
MICROSCOPE MEASURING DEVICE
Filed Dec. 18, 1947        2 SHEETS—SHEET 2
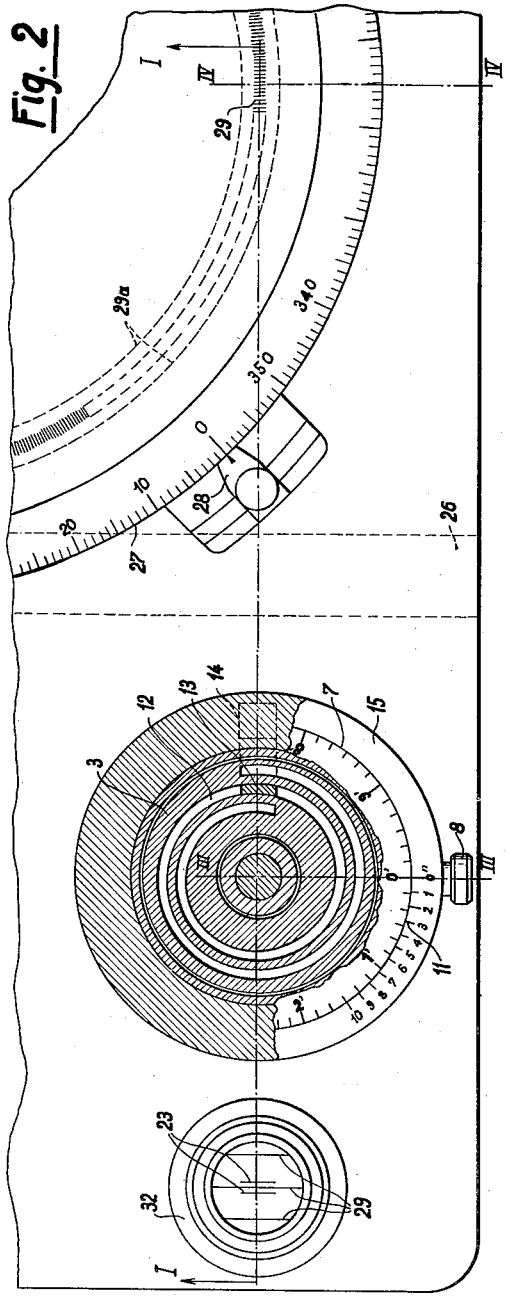
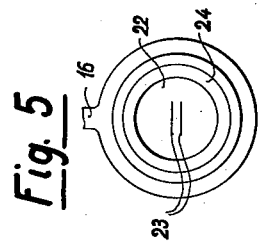
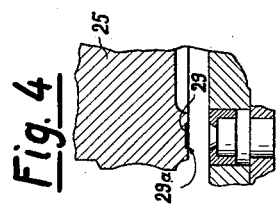
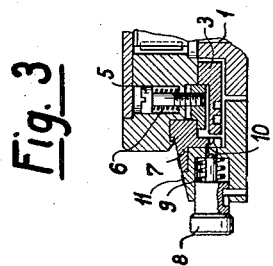
INVENTOR
GERMAIN ROLLAT
BY
ATTORNEY Patented Apr. 8, 1952

2,592,339

UNITED STATES PATENT OFFICE 2,592,339

MICROSCOPE MEASURING DEVICE

Germain Rollat, Geneva, Switzerland, assignor to the firm Societe Genevoise d'Instruments de Physique, Geneva, Switzerland, a firm of Switzerland Application December 18, 1947, Serial No. 792,541
In Switzerland April 4, 1944

Section 1, Public Law 690, August 8, 1946
Patent expires April 4, 1964

2 Claims. (Cl. 116—133)

This invention relates to a new and useful improvement in the accurate setting devices applied on dividing plates or tables intended to perform angular divisions, which are used for imparting to members disposed on said tables angular displacements of high accuracy and are especially applied to machine-tools.

The member to be machined is secured on the plate or table so that its centre coincides with the centre of the table. The angular displacements of the table controlled by hand or with the help of a motor, are measured by means of two circular graduated scales; one scale, situated on the periphery of the plate or table, is divided in degrees, for instance, and allows to effect, with respect to an adjustable index, an approximate measure, to the naked eye, and with the approximation of one degree, for instance. The other scale, finely divided, is situated for instance under the plate or table, is well protected and can be observed by means of an optical device comprising a microscope the reticle of which is provided with a movable index mark; the displacements of this latter are controlled by means of a micrometric device comprising a graduated drum cooperating with a vernier allowing an accurate measure of these displacements, with an approximation of a second for instance. It is possible to measure very exactly the position of the index of the reticle between two divisions of the graduated scale and thus to obtain the fractions of degrees perfecting the measure.

The operation of setting the table must always be undertaken on a reference position of the setting device which is further on called zero position.

In the devices of this kind the zero setting can be performed by two different methods, viz.: either by displacing a graduated scale or the circular precision graduation with respect to the index of the microscope, which latter remains steady, or on the contrary by displacing, with respect to the precision graduation, which remains steady, the index, by means of a micrometer screw, with the view of bringing into coincidence a movable graduated micrometer drum which is set to zero, without displacing either the scale or the microscope.

The present invention relates more particularly to a microscope measuring device allowing operation according to the second above mentioned method. It provides a microscope provided with a micrometer drum frictionally mounted on a screw, which latter displaces an index to be sighted in the field of view of the microscope.

According to a feature of the invention, a plunger mounted on a fixed part, co-operates with a conical notch of the drum in order to immobilize this latter when the zero of its graduation is located in front of a fixed index and to keep it in this position during the setting of the index.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 2 is a top plane view of a part of said circular table and of the setting device which comprises a microscope and a micrometer device, this latter having parts shown in horizontal section.

Fig. 3 is a sectional view of a detail along line III—III of Fig. 2.

Fig. 4 is a sectional view of a detail along line IV—IV of Fig. 2.

Fig. 5 is a profile view of a detail seen from the right side of Fig. 1 on enlarged scale.

Figure 1:
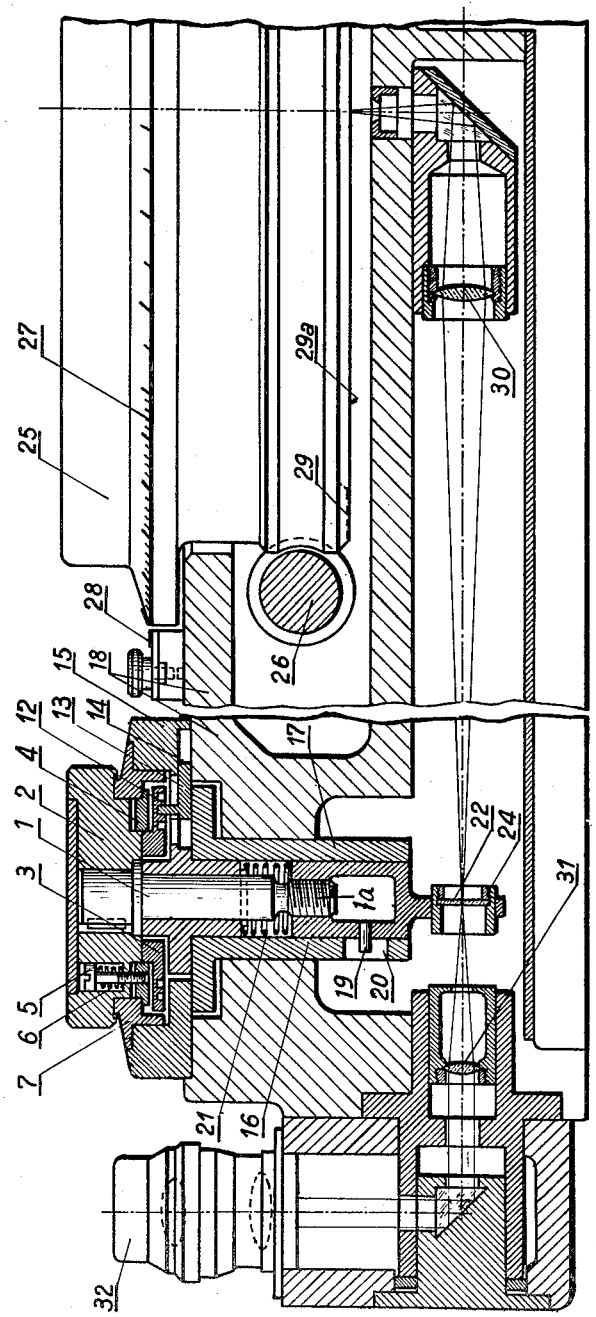
Fig. 1 is an elevational section, along the line I—I of Fig. 2, of a circular table provided with a setting device constructed in accordance with this invention.

The circular table according to this invention includes a table 25 driven about its axis by a worm screw 26. The table carries on its periphery a coarse graduation 27 in front of an adjustable index 28, fixed on the portion 18 of the supporting frame. This graduation is used for the coarse adjustment of the dividing table. For the fine setting, a special precision graduation 29 is provided at the lower part of the dividing table, on all the annular surface 29a (see Fig. 4). This precision graduation is protected against dust and foreign matters by adequate means.

The marks of graduation 29 are projected by an objective 30 onto a glass plate 22, adjustable in position and provided with an index 23, formed by two parallel marks (see Fig. 5).

A second objective 31 takes up the image of this glass plate and of the graduation marks and projects them into the eye-piece of the microscope 32.

I is the shank of a micrometer, screw 1a of the micrometer, to which a head 2 is keyed. A disc 3 is fastened underneath the head 2 and revolves as a whole with it. In the space provided between the head 2 and the disc 3, a ring 4 is fastened by several screws 5 of which a single one is visible on the drawing. A spring 6 pushes each screw upwards, and thereby urges the ring 4 to rest position underneath the graduated ring 7 forming a micrometer drum loosely mounted underneath head 2. This drum co-operates with the vernier 11; the springs 6 determine a friction between the parts 2, 4 and 7.

A plunger 8, controlled by a spring 9 is mounted in the casing 15 and can, when a pressure is put on its head, engage in a conical notch 10 provided on the periphery of the graduated ring 7 (see Fig. 3). The position of this notch is such that, when the plunger engages therein, the zero of the ring graduation comes to lie exactly in front of the zero of the vernier 11.

The disc 3 is provided with a spiral groove 12 in which engages a sliding block 13 movable radially in a recess 14 of the main casing 15. The length of the spiral groove 12 and the dimensions of the sliding block are combined in such a way that the rotation of the micrometer head is limited to a given number of revolutions.

The micrometer screw 1a acts on a nut 16 sliding into a sleeve 17 dependent on the casing 15 and on the dividing table bed (or machine bed, as the case may be). A pin 19, guided into a groove 20, prevents the rotation of the nut. This latter is moreover subjected to the action of a spring 21 which eliminates any axial play of the screw threads. The above mentioned plate 22 with its index mark 23 is fastened in a fixture 24 dependent on the nut 16 which thus controls any axial displacement of the index.

The zero setting of the measuring elements is performed as follows:

The index mark 23 is set opposite the zero mark or to whatever other mark corresponding to a full figure of the graduation 27, and is clamped. The micrometer head is then revolved until the zero marks of the drum graduation and of the vernier 11 are approximately located opposite each other.

Now, the plunger 8 is pushed into the notch of drum 7 and this latter takes thus the correct position. The micrometer head is further rotated until the double marks of the index 23, seen in the field of view of the eye-piece, frame up the mark of the graduation which is placed in the best possible way in the direction of increasing readings. After this setting, plunger 8 can be set free, the zero setting of the measuring elements being reached; the spiral groove 12 and the sliding block 13, limiting the rotation of the screw, as previously explained, prevent the index 23 from getting out of the field of view of the objective 32, by a faulty operation.

After this setting to zero, the measuring operation can be carried out: For instance for measuring the angle comprised between two determined points of the plate or table, the setting to zero is effected on one of these points preferably observed by means of a microscope. The plate is then turned, by means of the worm screw 26, until the second point be likewise alined on the optical axis of the microscope. The whole number of degrees of this rotation is read on the graduated scale 27. The micrometric head 2 is then turned in the increasing direction of the graduation of the drum, until the nearest division of the precision graduation 29 be enclosed between the two marks of the index 23; the minutes and the seconds completing the measure of the angle are then read on the graduated drum and on the vernier.

The reciprocal operation, that is to say the rotation of the table of a given angle can also be carried out: In this case, afterwards the setting to zero above disclosed is effected, the micrometer head 2 is turned until the graduated drum and the vernier indicate the minutes and the seconds completing the angle of which the table is to be rotated. The rotation of the table is then effected, by means of the worm screw 26, first coarsely, until the whole number of degrees of said prescribed angle, on the graduation scale 27, is opposite the index 28, and then accurately, until the nearest division of the precision graduation 29 appears as enclosed between the two marks of the index 23. Thus the table has been rotated exactly of the given angle.

While I have illustrated and described a special preferred embodiment of my invention, it is to be understood that I do not limit myself to the precise construction herein disclosed and the right is reserved to all changes and modifications coming within the scope of the invention as defined in the appended claims.

What I claim is:

1. In a micrometrical device, a casing, a micrometer screw, a graduated micrometer drum frictionally mounted on said screw and having a conical notch on its periphery, a stationary index on said casing in front of the graduation of said drum, a conical plunger mounted in said casing for locking said drum by interengagement with said notch when the zero of the drum graduation is in alignment with said stationary index and means for limiting the rotation of said screw, whereby independent rotation of said screw is allowed whilst the drum remains stationary, what makes it possible to keep the zero of the drum graduation in coincidence with said stationary index whilst displacing the micrometer screw, said zero of the drum graduation corresponding thus to any desired position of the micrometer screw.

2. In a micrometrical device, a casing, a micrometer screw, a graduated micrometer drum frictionally mounted on said screw and having a conical notch on its periphery, a stationary index on said casing in front of the graduation of said drum, a conical plunger mounted in said casing for locking said drum by interengagement with said notch when the zero of the drum graduation is in alignment with said stationary index, a disk dependent in rotation on the screw, a spiral groove in said disk, a recess in the frame and a sliding block engaging in said groove and radially movable in said recess, whereby the rotation of the micrometer screw is limited to a given number of revolutions through the thrust of the sliding block against the ends of the recess and whereby independent rotation of said screw is allowed whilst the drum remains stationary, what makes it possible to keep the zero of the drum graduation in coincidence with said stationary index whilst displacing the micrometer screw, said zero of the drum graduation corresponding thus to any desired position of the micrometer screw.

GERMAIN ROLLAT.

REFERENCES CITED

The following references are of record in the file of this patent:

UNITED STATES PATENTS

| Number | Name | Date |
| --- | --- | --- |
| 1,205,726 | Fieldwick | Nov. 21, 1916 |
| 1,676,964 | Rankin | July 10, 1928 |
| 1,760,938 | Edgar | June 3, 1930 |
| 1,775,952 | Turrettini | Sept. 16, 1930 |
| 2,043,625 | Lindner | June 9, 1936 |
| 2,079,791 | Cook | May 11, 1937 |
| 2,110,958 | Lindner | Mar. 15, 1938 |